United States Patent Office 3,277,052
Patented Oct. 4, 1966

3,277,052
PROCESS FOR CURING POLYEPOXIDES AND RESULTING PRODUCTS
Alan Thompson, Woodham, Woking, and John Michael Sprackling, Amersham, England, assignors to Shell Oil Company, New York, N.Y., a corporation of Delaware
No Drawing. Filed Feb. 1, 1963, Ser. No. 255,656
Claims priority, application Great Britain, Feb. 6, 1962, 4,527/62
18 Claims. (Cl. 260—47)

This invention relates to compositions derived from polyepoxides, and especially ones for use as surface coatings, e.g. for roads and floors.

For many applications, ambient temperature cure of polyepoxide compositions is essential or very desirable; but the reaction mixture of polyepoxide and curing agent suffers from the disadvantage that the pot life is often only about 20 minutes or less. It has now been found that by using acid salts of amines or polyamides, especially aliphatic amines, as the curing agent, no curing will take place until the acid salt is decomposed.

According to this invention therefore, a process of curing a polyepoxide is one in which a mixture comprising a polyepoxide having an epoxy equivalency greater than 1.0 (i.e. an average of more than 1.0 epoxy groups per molecule) and an acid salt of an amine or polyamide, is reacted with a dry base, or alternatively in which the mixture is heated to a temperature above the temperature of decomposition of the acid salt.

The process of this invention is particularly suitable for the preparation of compositions in which coal tar, bituminous or asphaltic or similar products are incorporated. Accordingly therefore, a process for the production of a cured product is one in which a mixture comprising an extender (as hereinafter defined), a polyepoxide having an epoxy equivalency greater than 1.0, and an acid salt of an amine or polyamide, is either reacted with a dry base, or heated to a temperature above the temperature of decomposition of the acid salt.

According to this invention new compositions comprise a polyepoxide having an epoxy equivalency greater than 1.0, an acid salt of an amine or polyamide, and an extender (as hereinafter defined).

An extender is defined as a compound or mixture of compounds having a high boiling point (i.e. the or initial boiling point is above 150° C.) which is inert chemically to the other constituents present and which is compatible with the remainder of the mixture, on mixing, during and after cure. Examples of extenders are coal tar, refined coal tar, coal tar pitch, single phase highly aromatic asphalt residue. Other examples are transformer oils, lubricating oils, fuel oils or aromatic extracts obtained by solvent extraction of lubricating oil distillates, which all have low viscosities of below 2300 S.S.U. at 122° F.

The polyepoxide used in the process of the present invention is an organic material having more than one vic.-epoxy group. It may be saturated or unsaturated, aliphatic, cycloaliphatic, aromatic or hetrocyclic; and it may be substituted by, for example, chlorine atoms, hydroxy radicals, and ether radicals.

Examples of polyepoxides that may be used are disclosed in U.S. 2,633,458. Polyepoxides having an epoxy equivalent weight of between 140 and 525 e.g. between 170 and 290 are preferred. Polyepoxides having an average molecular weight below 1,200 (e.g. between 280 and 900) are also preferred. They also have a functionality (i.e. ratio of molecular weight to epoxy equivalency) of at least one, preferably between 1.5 and 3.0. Suitable polyepoxides are polyepoxides formed from an epihalohydrin (for example epichlorhydrin) and a polyhydric compound e.g. bisphenol A [2,2-bis(4-hydroxyphenyl)-propane] or glycerol.

A group of suitable polyepoxides are esters of polyhydric alcohols and epoxy-substituted monocarboxylic acids; for example: glycerol tri-(8,9-epoxydodecanoate); glycerol 10,11-epoxyoctadecanoate; and epoxidised triglycerides (for example epoxidised soybean oil, sardine oil and cottonseed oil).

Other suitable polyepoxides are esters of epoxy-substituted alcohols and polycarboxylic acids; for example: diglycidyl adipate; diglycidyl succinate; diglycidyl dodecane-1,12-dioate; diglycidyl octadecane-1,18-dioate; diglycidyl eicosane-1,20-dioate; and diglycidyl eicosane-1,18-dioate.

Further suitable polyepoxides are polyepoxy esters of dimers of long chain unsaturated aliphatic acids, trimers of long chain unsaturated aliphatic acids, containing at least 8 carbon atoms, and mixtures thereof. Esters containing 20–70 carbon atoms in the molecule are suitable, because of their high degree of compatability. The properties of the esters do not vary greatly according to the particular dimer and/or trimer acids used; but the esters of the trimer acids may be obtained with less than one epoxy group for each carboxyl radical of the acid by incompletely esterifying the carboxyl radicals in the trimer acid. The greatest difference in properties occurs when the nature of the epoxy group is varied. Polyepoxy esters of this group containing terminal epoxy groups are useful; because they are easily prepared, rapidly cured, and have superior properties. For example, the polyepoxy esters may be glycidyl esters of the dimer and/or trimer acids, and polymers thereof.

The dimer and/or trimer acids forming the acid portion of the polyepoxy esters may be derived from: naturally occurring fatty acids (for example inoleic acid, linolenic acid, eleostearic acid, resin acids, and ricinoleic acid); naturally occurring fatty acids together with monoethylenically unsaturated acids (for example oleic acid); and dibasic acids (for example 8,12-eicosadiene-1,20-dioic acid; 8-vinyl-10-octadecene-1,18-dioic acid; and 7,11-octadecadiene-1,18-dioic acid). They may be prepared by any known method; for example by heating the monomer acid or mixture of monomer acids under pressure in the presence of water. One such method is described in U.K. patent specification No. 639,551. If desired, various catalysts may be employed in order to obtain various advantages. Such catalysts include, for example, lead acetate, fuller's earth, bentonite, and crystalline clays such as those described in U.S. Patent 2,793,219. The acids may also be obtained by heating the methyl esters of the acids by the method described in "Industrial and Engineering Chemistry," vol. 38, page 1139 (1946); the structures of the products so obtained are believed to be those given in "Industrial and Engineering Chemistry," vol. 33, page 89 (1941).

The preferred polyepoxide is the polyepoxide prepared by the reaction of an epihalohydrin e.g. epichlorohydrin with diphenylolpropane (bisphenol A) which has an epoxy equivalent weight of between 175 and 210, an average molecular weight of between 350 and 400 and an OH equivalency of about 1250. Another very suitable polyepoxide is that prepared by the reaction of an epihalohydrin with glycerol which has an epoxy equivalent weight of between 140 and 160 and an average molecular weight of between 290 and 340 e.g. 300. Another very suitable polyepoxide is made by reacting a salt of dimerised linoleic acid e.g. the sodium salt, with an epihalohydrin, the epoxy equivalent weight of the final product being between 400 and 420.

Mixtures of polyepoxides, or mixtures of polyepoxides with monoepoxides may be used. Examples of suitable monoepoxides are phenyl glycidyl ethers of any phenol or aliphatic alcohol, olefin oxides, or glycidyl esters of mono carboxylic acids.

Suitable amines from which the acid salt is derived are primary, secondary or tertiary amines. It may be any aliphatic, cycloaliphatic or aromatic polyamine.

Examples of suitable amines are alkyl-substituted diamines and also aromatic and hydroaromatic amines, e.g. ethylene diamine, diethylene triamine; 2,4-diamino-2-methyl pentane; dimethylamino- and diethylaminepropyl-amine; bis(4-aminophenyl)-methane; metaphenylene diamine; propylene diamine; triethylene tetramine; amino ethyl ethanolamine; N(hydroxy ethyl) diethylene triamine; dimethyl diamino dicyclohexylamine; cyclohexyl propylene diamine; methane diamine or di(aminomethyl) benzenes. Mixtures of these amines may be used.

Preferred polyamines are those which are alicyclic or aliphatic in character and are composed of only carbon, hydrogen and nitrogen. Examples of the class are the alkylene diamines (e.g. ethylene, propylene and butylene diamines) and the polyalkylene polyamines. Of most importance, however, are the compounds wherein the polyamino group is a polyalkylenepolyamine group, having the formula

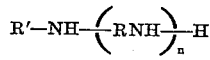

wherein R is an alkylene radical, or a hydrocarbon radical-substituted alkylene radical, R' is an organic radical or hydrogen, and $n$ is an integer greater than one. Those compounds in which $n$ is an integer between 2 and 6 are especially valuable, and those wherein the polyamino group is a polyethylene polyamino group are particularly preferred. These polyamino groups have the formula:

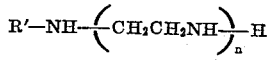

wherein $n$ is an integer of between 2 and 6. Mixtures of polyamines may be used.

Although not preferred, aromatic polyamines may however be used as for example those having one or more aromatic nuclei to which are attached a plurality of primary or secondary amino nitrogen atoms. The amino groups should possess at least 3 amino hydrogen atoms which need not be but preferably are attached to the same aromatic nucleus. Examples of the aromatic polyamines are, ortho, meta and para-phenylene diamine, N-methyl para-phenylene diamine, diamino-diphenyl-methane, N-ethyl p,p'-methylene dianiline, 2,4-diamino-toluene, 3,3'-diamino diphenyl, 1,3-diamino-4-iso-propyl-benzene, 1,3'-diamino, 4,5-diethylbenzene, N,N'-diphenyl-ethylene-diamine, and 2,6-diamino-anthraquinone. Mixtures of aromatic polyamines may be used.

Examples of other aromatic polyamines are those of the formula

and

wherein X is a polyvalent aromatic hydrocarbon radical or hydroxy-substituted aromatic hydrocarbon radical, R is a hydrogen atom or an aliphatic hydrocarbon radical, $R_1$ is a divalent hydrocarbon, $n$ is an integer of at least 2, and 1 and $m$ are integers of at least 1; 1 and $m$ may be the same or different. The preferred amines of this class have three or four amino hydrogen atoms per molecule. Mixtures of these aromatic polyamines may be used.

The piperazines are also amines which may be used as curing agents. The piperazines, substituted or unsubstituted, have an amino-substituted alkyl group attached to one of the ring nitrogen atoms. Preferred members are those of the formula:

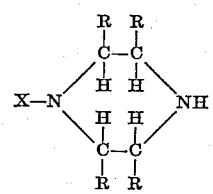

in which R is hydrogen or an alkyl radical or alkoxy radical and X is an amino-substituted alkyl radical. Examples of these compounds are N-aminobutylpiperazine, N-aminoisopropyl-3-butoxy-piperazine. N - aminoisopropyl - piperazine, 2,5-dibutyl-N-aminoethylpiperazine, and 2,5-dioctyl-N-aminobutylpiperazine. The preferred compound is N-amino-ethylpiperazine. Mixtures of piperazines may be used.

Polyamides may also be used as the curing agent. These include polyamine derivatives of long-chain fatty acids, adducts of amines and epoxidised oils or alkenes and in particular condensation products obtained by dimerisation or trimeristation of an unsaturated fatty acid derived from a drying oil, e.g. linseed oil fatty acid and reacting the resultant polymeric acid with an aliphatic polyamine such as ethylene diamine or diethylene triamine. Said amino compounds contain primary and/or secondary amino groups and may also contain tertiary amino group: they contain in the molecule at least 3 hydrogen atoms bound to amino nitrogen and have a molecular weight of more than 300, preferably of more than 500. The latter condensation products are known in the trade as "polyamide resins." Liquid polyamide resins are for instance some of those sold under the registered trade mark "Versamid," of which "Versamid" 140 is an example. Other liquid "Versamid" resins and similar type products such as "Versamid" 115 and 125 can be used. Preferred liquid polyamide resins are those of low viscosity (i.e. less than 12 poises at 25° C.), for example Thiokol EM-308 or Genamid 250 and Genamid 310.

Mixture of any of these classes of amines and/or polyamides may be used, mixtures of polyamines and polyamides being especially suitable.

Aromatic compounds containing a reactive NH or —NH$_2$ group when used as curing agents need the application of heat eg. 60° C. to 200° C. for periods of time of respectively between 12 hours and 1 hour. Consequently, the acid salts of aliphatic and alicyclic compounds containing reactive >NH or —NH$_2$ groups are preferred; for when the salt is decomposed the cure takes place at ambient temperatures. They must, of course, be used where the use of heat is not possible for the particular application required. Salts of aromatic compounds containing a reactive >NH or —NH$_2$ group can, with the application of heat, however, be used quite conveniently for various electrical applications such as castings and encapsulations.

The acid from which the acid salt is derived is preferably an organic acid, although it may be an inorganic acid, e.g. hydrochloric acid or sulfuric acid. Preferred organic acids are carboxylic acids especially the mono-carboxylic acids, e.g. formic acid, acetic acid, propionic acid or butyric acid or "Versatic" acids. "Versatic" acids are acids prepared from the reaction of an olefin, carbon monoxide, and water in the presence of a highly acidic catalyst. Acids preferably contain 1 to 12 carbon atoms.

The dry base must be a substance more basic than the amine or polyamide curing agent, and may be an oxide, hydroxide, bicarbonate or carbonate of a metal, especially of an alkali or alkaline earth metal. The base must also be dry, i.e. the water content must not be more than that which together with the water present in the other reactants of the reaction mixture (e.g. polyepoxide, curing agent and extender) results in a total water content in the reaction mixture of more than 1% by weight. If the reactants which are used, are dry in the normal commercial sense of the word, this condition will normally be met. If a bicarbonate or carbonate be used, the resulting product may be foamed. Examples of suitable bases, are alkali metal hydroxides, e.g. sodium hydroxide or potassium hydroxide, Group II metal oxides and hydroxides, e.g. calcium or barium oxides, or "lime" as used and sold in the building industry, or alkali metalbicarbonates or carbonates, e.g. sodium bicarbonate, potassium bicarbonate or sodium carbonate. Ammonium bicarbonate, or a quaternary ammonium hydroxide, may also be used. The quantity of base used is preferably at least stoichiometric, and for lime [CaO and Ca(OH)$_2$] it has been found that at least two times, but preferably between four and five times stoichiometric has been found to be suitable. The stoichiometry is based on the amount of acid in the salt. Alternatively, the acid salt may be decomposed by heating the mixture to a temperature above the temperature of decomposition of the acid salt.

The coal tar, refined coal tar or coal tar pitch which may be used as an extender preferably has a softening point below 90° C., and a solubility in carbon disulfide of at least 50%. The expression "tar" as used herein refers to products obtained by the destructive distillation of coal. When part of the volatile material is removed, the residue is called "refined coal tar." When further volatile material is removed, the residue is then termed "coal tar pitch." Residuals having a fusing point below 26° C. are considered as refined coal tars, while those having a fusing point of 26° C. or above are coal tar pitches. The softening points or fusing points referred to herein are those determined by the cube method. (See vol. II, 5th ed., Abraham, "Asphalts and Allied Substances".) The coal products should possess a solubility in carbon disulfide of at least 50% and preferably 75%. The coal tar, refined coal tar and coal tar pitch may be acidic, basic or neutral, depending on whether the acidic or basic components have been removed. These coal products may be obtained from various types of bituminous coals and may be derived from various sources, such as gas works, coke ovens, blast furnaces or gas producers. Descriptions of examples of various coal tars, refined coal tars and coal tar pitches that may be used in the compositions of the present invention may be found on pages 384 to 405 of Abraham, "Asphalts and Allied Substances," 5th ed., vol. I.

Particularly preferred coal products which may be used in the compositions of the present invention include refined coal tars having a fusing or softening point of below 26° C. and a solubility in carbon disulfide of at least 75% with a specific gravity (at 25° C.) of 1.10 to 1.50, and low melting refined coal tar pitches having a fusing or softening point below 50° C. and a solubility in carbon disulfide of at least 75%. For the preparation of laminates, those coal tars may also suitably be used which have a specific gravity of 0.80 to 1.50, a fusing or softening point below 10° C. and a solubility in carbon disulfide of 60% to 98%.

The single phase highly aromatic asphalt residue is preferably a homogeneous single phase highly aromatic petroleum residue having a precipitation index of between 50 and 100.

The precipitation index of a petroleum residue is a simple and useful means of stating the solubility characteristics of the residue. Determination of the precipitation index consists of preparing a 10% solution of the residue in alpha-methylnaphthalene and titrating this solution with n-hexadecane to the point at which precipitation occurs. The occurrence of precipitation is easily detected by placing a small drop of the solution on filter paper periodically during the titration. A definite dark ring of precipitated material will clearly indicate the points of precipitation. The volume percent of alpha-methylnaphthalene in the solution at the point of precipitation is designated as the precipitation index. Highly aromatic petroleum residues tend to precipitate from solution in alpha-methylnaphthalene with the addition of only a small amount of n-hexadecane and hence such materials will have a high precipitation index. Residues whose aromatic constituents have appreciable number of alkyl side chains and naphthenic rings as substituents will remain in solution even when relatively large amounts of n-hexadecane are added and hence will have a low precipitation index. Most virgin crude oil residues have precipitation index values in the range of 20–40, the exact value depending on the hydrocarbon type composition of the crude.

In the course of refining of petroleum, the application of various processes leads to changes in the chemical constitution and hence to the solubility characteristics of various residues and other high-boiling fractions. Thermal cracking of petroleum residues for the production of distillate fractions generally raises the precipitation index of the residue from the 20–40 range to the 40–70 range, the exact increase in precipitation index being closely related to the severity of thermal cracking. Catalytic cracking of distillate oils leaves high-boiling catalytically cracked gas oils whose highest boiling components may have precipitation indexes in the range 60–80. The high-boiling portions of coking cycle stocks also have precipitation indexes in the range 60–80. When the residual fuel oils from petroleum are pyrolyzed for the production of gas in the oil-gas process, the residues remaining have a precipitation index in the range 80/95.

It has now been found that the incompatibility which was previously considered to be characteristic of polyepoxides and petroleum fractions is no longer encountered when the petroleum fraction is characterized by a precipitation index between 50 and 100. Thus when the petroleum fraction is chosen by this criterion it proves to be possible to produce a wide variety of products in which the petroleum fraction may be one or more of the following:

(1) Thermally cracked residues;
(2) High-boiling fractions of catalytically cracket gas oil particularly fractions having a boiling range of 600° F. to 900° F.;
(3) Residue from thermal cracking of catalytically cracked gas oil particularly and having boiling range of 600° F. to 900° F.;
(4) High-boiling fractions of coking cycle stock particularly a fraction having a boiling range of 600° F. to 900° F.;
(5) Residues from pyrolysis of residual petroleum fuel oils used in the production of gas.

Highly aromatic materials obtained as residues from the distillation of catalytically cracked gas oil or clarified oil are particularly preferred.

Especially preferred are the highly aromatic petroleum residues having a precipitation index of 50–80. The thermally cracked residues having a precipitation index of 50–90 are very useful.

The transformer oil is a highly naphthenic distillate so that it is stable towards oxidation and so that it is free from impurities leading to low electric strength or inferior dielectric properties. The percentage of aromatic constituents present in the transformer oil is an important factor in the performance of such an oil during use. It has been found that for a transformer oil, the sludge value and neutralization number after oxidation in the test specified in Appendix B of British Standard 148, 1951, and the inhibitor susceptibility assessed by the same test are largely dependent upon the concentration of the aromatic constituents therein. For example, the sludge value first increases sharply with increasing concentration of the aromatic constituents, passes through a maximum at about 8% by weight of aromatic constituents, then decreases rapidly with increasing concentration of aromatic constituents, but remain remarkably constant at concentrations exceeding 11% by weight of aromatic constituents. The aniline point (which is a measure of the proportion of aromatics) of a typical transformer oil is about 60° C.

The lubricating oils which may be used may be not only mineral lubricating oils but also the aliphatic di-esters, phosphate esters, aliphatic esters of pentaerythritol, silicate esters, siloxanes and polyoxyalkylene-ethers and -esters.

Examples of suitable mineral lubricating oils which may be used are those of any lubricating viscosity, ranging from about 50 SSU at 122° F. to about 2000 SSU at 122° F. The viscosity index of the oil can vary from below 0 to 100 or higher and the oil can have average molecular weights ranging from about 250 to about 800. It may, if desired, be highly refined and solvent treated by known means. The hydrocarbon oil may be of synthetic or mineral origin, although mineral oils are preferred.

The lubricating oils may be composed solely of mineral oil lubricants or may be replaced by or mixed with other hydrophobic lubricating oils, including tricresyl phosphate, trioctyl phosphate, tributyl phosphate, di-esters such as bis-2-ethylhexyl sebacate, dinonyl adipate; pentaerythritol esters; silicate esters, such as tetraoctyl silicate; polyoxyalkylene compounds, such as ethylene oxidepropylene oxide copolymers in which the end groups are either esterified or etherified; silicone oils, such as dimethyl silicone, methyl-phenyl silicone or chlorinated methyl-phenyl-silicone.

The aniline point of a typical lubricating oil is between 60° and 65° C., e.g., about 63° C.

Suitable fuel oils include petroleum hydrocarbon oils, for example, gasoline fractions which are obtained by the cracking or reforming of petroleum hydrocarbons or mixtures of different hydrocarbon oils such as mixtures of cracking distillates and straight-run distillates. Other suitable fuel oils are those petroleum hydrocarbon fuels which are suitable for spark ignited internal combustion turbine engines, for internal combustion engines, for internal combustion turbine engines, and for heating or lighting apparatus.

The aniline point of typical fuel oil is between 5° and 15° C. e.g., about 10° C.

The lubricating oil distillates from which the aromatic extracts are obtained by solvent extraction preferably have viscosities between 150 and 300 SSU at 122° F. The solvents which may be used include sulfur dioxide, Edeleanu solvents and furfural. The unrefined lubricating oil is separated into two phases, a paraffinic raffinate and an aromatic extract. The solvent is recovered from both phases by distillation. The refined aromatic extract is a complex mixture of aromatic and naphthenic hydrocarbons, and has a low aniline point. The solvent extracted aromatic extract preferably has an aromatic content of at least 50% by weight particularly 60 to 65% by weight and preferably a viscosity at 122° F. of between 100 and 2300 SSU.

The preferred solvent extracted aromatic extract has a specific gravity at 60° F. of about 0.99, a viscosity at 70° F. of about 256 SSU, an aniline point of about −13° C., a pour point of about −35° F., a refractive index at 50° C. of about 1.55 and a flash point Pensky Martin (° F.) (open cup) of about 330.

Other examples of extenders are diluents such as aromatic hydrocarbons for instance alkylated benzenes (such as toluene, the xylenes, and ethyl benzene), and alkylated naphthalenes. Halogen substituted hydrocarbons, preferably wherein the halogenated is in the aryl nucleus, e.g., chlorobenzene, may also be used. Preferred diluents are high boiling highly aromatic hydrocarbon solvents especially those having an aromatic constant of at least 80% by volume. They are mixtures of aromatic hydrocarbons and usually have a fairly wide boiling range, e.g. 205° C. to 275° C., 180° to 215° C., 160° to 275° C., 160° to 180° C. and 153° to 195° C. Alternatively, furfuryl alcohol, tetrahydrofurfuryl alcohol, or gamma-butyrolactone may be used.

Pine oil or dibutyl phthalate, may alternatively or in addition be used as extenders.

According to a preferred embodiment of the process of the invention the mixture comprising polyepoxide having an epoxy equivalency greater than 1.0, acid salt of an amine or polyamide and extender also comprises a phenol, before the mixture is either heated or reacted with a dry base. Preferred compositions of the present invention therefore comprise a polyepoxide having an epoxy equivalency greater than 1.0, an acid salt of an amine or polyamide, an extruder (as hereinbefore defined) and a phenol.

Although monohydroxy benzene may be used, hydrocarbon substituted phenols are preferred. They may be a monohydric or polyhydric phenol that is substituted by at least one hydrocarbon group, which is preferably an alkyl group. The position of the side chain, or side chains, attached to the aromatic ring is not important. Examples of such compounds are: cresols; dinonyl phenol; dioctyl phenol; didodecyl phenol; ditetradecyl phenol; dioctadecyl phenol; trinonyl phenol; nonyl phenol; octyl phenol; heptyl phenol; dodecyl phenol; diheptyl phenol; pentadecyl phenol; heptyl dodecyl phenol; heptyl ditetradecyl phenol; eicosanyl phenol; dinonyl resorcinol; dioctyl resorcinol; 2,2-bis(4-hydroxy-3-nonylphenyl)propane; 2,2-bis-(4-hydroxy-3,5 - dioctylphenyl)propane; bis(hydroxynonylphenyl)methane; 2,2 - bis(4 - hydroxy-2-decylphenyl)butane; dioctenyl phenol; and tritetradecyl phenol.

Preferred hydrocarbon-substituted phenols are those possessing at least 7 carbon atoms in the side chain or in at least one of the side chains, and especially the monoand di-alkyl substituted monohydric phenols and dihydric phenols wherein the alkyl side chain contains from 7 to 24 carbon atoms. Most preferred phenols are the monoand di-alkylated phenols containing between 9 and 18 carbon atoms per alkyl group, for example, dinonyl phenol, didodecyl phenol, dodecyl phenol and octadecyl phenol.

In the processes or compositions of this invention, the proportion of polyepoxide in the total mixture is preferably not more than 75%, e.g., between 30% and 60% by weight. The acid salt of the amine or polyamide is preferably present in an amount between 0.5 and 1.5 of the stoichiometric amount required for the amine or polyamide to react with the epoxide groups in the polyepoxide present in the composition (i.e., one amino hydrogen per epoxy group).

In cases where both an extender and phenol are present, the relative proportions of extender and phenol depend largely on the aniline point of the extender oil. The lower the aniline point the greater the aromatic content of the extender and a smaller amount of phenol is required. Conversely, the higher the aniline point, the less the aromatic content of the extender and a larger amount of phenol is required.

The compositions prepared by the process of the invention wherein extender is incorporated may be used in many applications. Thus, they may be used as surface coatings which have good adhesion to cement, asphalt and metal surfaces, and have good resistance to wear and chemical attack. The coatings are particularly attractive in that they can be prepared at a low cost, can be easily applied to large areas without the use of solvents.

When small inert particles, aggregates or pigments are added to the compositions before or during cure, the cured coatings also display excellent resistance to skidding. The coatings are particularly attractive for use on floors, roads, and runways, as they can be easily applied to large areas and set up quickly without the use of any special curing conditions.

These compositions may also be used as binders for grit layers for the coating of already prepared concrete and metal surfaces and as binders for aggregate in the preparation of new roads and pavements and surfacing ship's decks. In the case of the grit layers, the compositions are combined with a relatively large proportion (i.e., at least four times by weight) of hard abrasive inert particles which are preferably finely divided and have a mesh size varying from about 4 to 500. In practice, it is necessary to use a much larger quantity (i.e., about 15 times or more) of particles, to prevent "gumming up" of the rollers when laying the composition. The surplus particles are brushed off after cure. Suitable particles include sand, crushed rock, crushed quartz, aluminum oxide, silicon carbide and emery. Preferred materials to be employed are the minerals and especially the siliceous materials, such as, for example, sand and ground rock. Mixtures of various types of particles may also be employed.

When being used as a binder for aggregate for the preparation of new roads, the above compositions are mixed with various types of aggregate, for example, ground rock which has a larger size than the grit particles. These materials preferably have a mesh size varying from about 0 to 50.

The amount of the inert particles and aggregate employed preferably comprises at least 50% by weight of the above compositions and still more preferably, makes up from 75% to 1000% by weight of the above compositions. When used with aggregate for the construction of roads, the compositions are preferably laid down in layers of about 1.0 cm. to 10 cm. thickness.

Owing to the particular proportions employed in producing a practicable composition it is not possible to mix polyepoxide, extender and aggregate together, and thereafter mix in thoroughly the small quantity of curing agent required. Therefore, the acid salt of the amine or polyamide should be mixed with the polyepoxide (with or without extender and phenol), before the acid salt is decomposed. The small quantity of dry base may be added and after spreading the mix, aggregate is added, e.g., scattered over the surface and compacted, e.g., by means of rollers. Alternatively, the aggregate including the dry base can be mixed with the fluid portion (i.e., the polyepoxide plus extender, plus phenol if used) in any suitable mixing machine, and spread, e.g., by trowelling or road laying.

When used as coatings, the compositions prepared by the process of the invention may be applied to any surface, but are particularly suitable for use as surfacing compositions for cement, asphalt, asbestos, wood and steel. The cement surfaces may be any of the usual types such as may be prepared from hydraulic cements, such as Portland cement and other types of aluminous cement. The asphalt surfaces may be those prepared from straight run asphalts or further refined or modified asphalts. The compositions may be applied in very thin coatings or in very thick coatings. The applications to the surface can be accomplished in any suitable manner. If material is thick or contains large amounts of inert particles, the materials may best be applied by use of a screed, trowel, shovel or broom. If it is of a more fluid nature, it may be applied by brushing or spraying. The coating will generally vary in thickness from about 1.5 mm. to about 12 mm.

The process and compositions of this invention may be used for a great variety of other applications. They may be used, for example, in the preparation of roofing materials, pottings, castings and encapsulations, sealing and impregnating compositions, as coatings for pipes, offshore drilling rigs, outdoor wood and metal equipment, cable jointing, expansion joints, e.g., concrete to concrete joints, and in the lamination field, e.g., in the preparation of glass laminates.

Advantages of the processes of this invention are:

(1) Since no exotherm develops when the amine salt is mixed with polyepoxide, the batches can be of unlimited size. On addition of aggregate, (including base) the heat evolved by the curing reaction is absorbed by the large weight of the aggregate present and hence the batch size is again unlimited.

(2) The amine or polyamide salts are innocuous, and any danger therefore of the operators suffering from dermatits or asthma is eliminated.

EXAMPLE I

Experiments to determine the exothermic characteristics using N-amino ethyl piperazine, its acetate salt, and adding dry lime were carried out. In these experiments the test used was as follows:

Appropriate quantities of polyepoxide and curing agent were brought to the desired test temperature prior to mixing. The required proportions of epoxy resin and curing agent were then thoroughly mixed. A standard weight of mix (see table) was then weighed out into a tin of the appropriate size (see table). Without delay, a temperature sensitive element (mercury-in-glass thermometer or thermocouple) was inserted into the center of the resin mass. To enable it to be withdrawn at the end of the test, the temperature sensitive element was wrapped with tinfoil lubricated with grease. The resin mix and temperature sensitive element were then quickly placed in a constant temperature enclosure maintained at the required base temperature. Readings of temperature were taken each minute until the temperature began to fall.

Table

| Weight of mix (g.) | Diameter of Tin | | Base temperature (° C.) |
|---|---|---|---|
| | (ins.) | (cms.) | |
| 100±1 | 2¼±1/16 | 5.7±0.2 | 25±1 |

In these experiments the "polyepoxide" used was the polyepoxide prepared by the reaction of an epihalohydrin with diphenylolpropane having an epoxy equivalent weight of between 175 and 210, an average molecular weight of between 350 and 400 and an OH equivalency of about 1250, and the "aromatic extract" used was solvent extracted aromatic extract having a specific gravity at 60° F. of about 0.99, a viscosity at 70° F. of about 256 SSU, an aniline point of about −13° C., a pour point of about −35° F., a refractive index at 50° C. of about 1.55 and a flash point (Pensky Martin, open cup) of about 330° F.

In these experiments the components were mixed together in the proportions stated:

EXPERIMENT 1

Parts by weight
"Polyepoxide" _____ 37
N-amino ethyl piperazine _____ 9
"Aromatic extract" _____ 16
Dodecyl phenol _____ 38
    Time to peak exotherm _____min__ 19.5
    Peak exotherm temperature _____° C__ 95

EXPERIMENT 2

Parts by weight
"Polyepoxide" _____ 32
N-amino ethyl piperazine acetate _____ 18
"Aromatic extract" _____ 14
Dodecyl phenol _____ 36
    Time to peak exotherm _____min__ 12
    Peak exotherm temperature _____° C__ 30.5

The mix remained fluid for 2 days with a slow increase in viscosity.

EXPERIMENT 3

Parts by weight
"Polyepoxide" _____ 32
N-amino ethyl piperazine acetate _____ 18
"Aromatic extract" _____ 14
Dodecyl phenol _____ 36
Calcium oxide _____ 22.7
    Time to peak exotherm _____min__ 41
    Peak exotherm temperature _____° C__ 89

EXPERIMENT 4

| | Parts by weight |
|---|---|
| "Polyepoxide" | 37 |
| N-amino ethyl piperazine | 9 |
| "Aromatic extract" | 16 |
| Dodecyl phenol | 38 |
| Calcium oxide | 22.7 |
| Time to peak exotherm _____min__ | 15 |
| Peak exotherm temperature _____°C__ | 84 |

In the following example, the "polyepoxide" and "aromatic extract" used was the same as those used in the experiments.

EXAMPLE II

An asbestos plate was coated with a tack coat consisting of 100 parts by weight of binder to which 22.5 parts by weight of dry CaO was added. The binder consisted of 32 parts by weight of "polyepoxide"
18 parts by weight of N-amino ethyl piperazine acetate
14 parts by weight of "aromatic extract"
36 parts by weight of dodecyl phenol A further 100 parts by weight of binder was mixed with 5 parts by weight of green pigment. 900 parts by weight of graded sand and 22.5 parts by weight of dry lime were mixed together, and added to binder and pigment. This was then mixed thoroughly and then trowelled onto the prepared asbestos base, to a depth of about 0.3″.

After 7 days' cure at ambient temperature, the topping was subjected to a severe wear test under water. The topping was found to stand up to wear better than those prepared using the same system, only using N-amino ethyl piperazine itself as curing agent.

EXAMPLE III

Example I was repeated with the exception that the N-amino ethyl piperazine acetate is replaced with each of the following: N-amino ethyl piperazine propionate, N-amino ethyl piperazine octoate and diethylene triamine acetate. Related results are obtained.

EXAMPLE IV

Example I was also repeated with the exception that the polyepoxide is replaced with each of the following: diglycidyl resorcinol, polyglycidyl ether of 2,2-bis(4-hydroxyphenol)propane having a molecular weight of about 900, triglycidylbenzene, diglycidyl phthalate, epoxidized cyclohexenyl methylcyclohexanecarboxylate and digylcidyl sebacate. Related results are obtained.

EXAMPLE V

Example I is also repeated with the exception that the extender is replaced by each of the following: straight run asphalt, Edeleanu extract of a lube oil distillate, refined coal tar, coal tar pitch having a softening point of about 40° C., and an aromatic extract having the following properties:

| | |
|---|---|
| API gravity | 2.9 |
| Refraction index | 1.6151 |
| Flash point, COC, °F. | 525 |
| Viscosity, Saybolt Furol seconds at 210° F. | 202 |
| Aniline point, mixed, °F. | 87 |
| Mol weight | 410 |

Related results are obtained in each case.

We claim as our invention:

1. A composition comprising the cured reaction product of (1) a polyepoxide having an epoxy equivalency greater than 1.0, (2) a salt of an N-amino alkyl piperazine and an acid selected from the group consisting of inorganic acids and organic acids containing from 1 to 12 carbon atoms, (3) an inert high boiling compatible extender, and (4) a dry base which is more basic than the N-amino alkyl piperazine used in making the aforedescribed salt.

2. A composition as claimed in claim 1 wherein the polyepoxide has an epoxy equivalent weight of between 140 and 525.

3. A composition as in claim 1 wherein the polyepoxide is one prepared by the reaction of epihalohydrin with 2,2-bis(4-hydroxyphenyl)propane, the polyepoxide having an epoxy equivalent weight of between 175 and 210, and average molecular weight of between 350 and 400, and an OH equivalency of about 1,250.

4. A composition as in claim 1 wherein the polyepoxide is one prepared by reacting a salt of a dimersed linoleic acid with an epihalohydrin, the polyepoxide having epoxy equivalent weight of between 400 and 420.

5. A composition as in claim 1 wherein the polyepoxides make up from 10% to 75% by weight, the extender from 1 to 50% by weight and the acid salt from 2% to 30% by weight.

6. A composition as in claim 1 wherein the extender is a member of the group consisting of coal tar, refined coal tar and coal tar pitch.

7. A composition as in claim 1 wherein the extender is a single phase highly aromatic petroleum residue.

8. A composition as in claim 1 wherein the extender is an aromatic extract obtained by solvent extraction of lubricating oil distillates.

9. A composition as in claim 1 which also comprises a phenol.

10. A composition as in claim 1 wherein the composition also contains a hydrocarbon substituted phenol.

11. A composition as claimed in claim 1 wherein the amount of said N-amino alkyl piperazine is between 0.5 and 1.5 of the stoichiometric amount required for the N-amine alkyl piperazine to react the epoxide groups present in the polyepoxide.

12. A composition as in claim 1 wherein the composition also contains from 40% to 300% by weight of small inert particles.

13. A process for curing polyepoxides at about ambient temperature which comprises mixing the polyepoxide with (1) an inert, high boiling, compatible extender, (2) a salt of an N-amino alkyl piperazine and an acid selected from the group consisting of inorganic acids and organic acids containing from 1 to 12 carbon atoms, and (3) a dry base which is more basic than the N-amino alkyl piperazine used in making the aforedescribed salt, and allowing the mixture to set hard at ambient temperature.

14. A process as in claim 13 wherein the dry base is a Group II metal oxide or hydroxide.

15. A process as in claim 13 wherein the dry base is calcium oxide.

16. A process as in claim 13 wherein the quantity of base used is at least stoichometric based on amount of the acid in the salt.

17. A process as in claim 13 wherein after the dry base is added aggregate is added.

18. A process for curing at about 25% C. a polyepoxide prepared by reacting epichlorohydrin with 2,2-bis(4-hydroxyphenyl)propane and having an average molecular weight between 350 and 400, an epoxide equivalency between 175 and 210 and an OH equivalency of about 1250, which comprises mixing the said polyepoxide with (1) a petroleum derived solvent extracted aromatic extract having a specific gravity at 60° F. of about 0.99, a viscosity at 70° F. of about 256 SSU, an aniline point of about −13° C., a pour point of about −35° F., a refractive index at 50° C. of about 1.55 and a flash point of about 330° F., (2) an acetate salt of N-amino alkyl piperazine, and (3) dry CaO, and allowing the mixture to set hard at about 25° C. temperature.

(References on following page)

References Cited by the Examiner

UNITED STATES PATENTS

| | | | |
|---|---|---|---|
| 2,681,901 | 6/1954 | Wiles et al. | 260—18 XR |
| 2,844,552 | 7/1958 | Glaser | 260—18 XR |
| 2,899,397 | 8/1959 | Aelony et al. | 260—47 XR |
| 2,906,720 | 9/1959 | Simpson | 260—28 |
| 2,928,809 | 3/1960 | Hicks | 260—18 XR |
| 2,951,854 | 9/1960 | Chiddix et al. | 260—18 XR |
| 3,033,088 | 5/1962 | Wittenwyler | 260—28 |
| 3,057,809 | 10/1962 | Newey | 260—18 XR |
| 3,105,771 | 10/1963 | Simpson et al. | 260—28 |

FOREIGN PATENTS 629,111  9/1949  Great Britain.

OTHER REFERENCES

Epoxy Resins, Lee-Neville, McGraw-Hill, N.Y., 1957, page 8.

LEON J. BERCOVITZ, *Primary Examiner.*

C. W. IVY, *Assistant Examiner.*